(12) United States Patent
Ioannou et al.

(10) Patent No.: US 11,573,803 B2
(45) Date of Patent: Feb. 7, 2023

(54) PARALLEL TRAINING OF MACHINE LEARNING MODELS

(71) Applicant: International Business Machines Corporation, Armonk, NY (US)

(72) Inventors: Nikolas Ioannou, Zurich (CH); Celestine Duenner, Wettswil (CH); Thomas Parnell, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 923 days.

(21) Appl. No.: 16/405,334

(22) Filed: May 7, 2019

(65) Prior Publication Data

US 2020/0356815 A1    Nov. 12, 2020

(51) Int. Cl.
G06F 9/38      (2018.01)
G06N 20/00     (2019.01)
G06F 9/50      (2006.01)

(52) U.S. Cl.
CPC .......... *G06F 9/3885* (2013.01); *G06F 9/3851* (2013.01); *G06F 9/5061* (2013.01); *G06N 20/00* (2019.01)

(58) Field of Classification Search
None
See application file for complete search history.

(56) References Cited

U.S. PATENT DOCUMENTS

| 9,292,550 B2 | 3/2016 | Yarmus |
| 2014/0019984 A1 | 1/2014 | Li et al. |
| 2014/0380320 A1 | 12/2014 | Lin et al. |
| 2015/0025848 A1 | 1/2015 | Fukumoto et al. |
| 2016/0078361 A1 | 3/2016 | Brueckner et al. |
| 2016/0162800 A1 | 6/2016 | Qin et al. |
| 2016/0307098 A1 | 10/2016 | Goel et al. |
| 2017/0236072 A1 | 8/2017 | Rendle et al. |
| 2018/0314971 A1 | 11/2018 | Chen et al. |
| 2020/0042362 A1 | 2/2020 | Cui et al. |

FOREIGN PATENT DOCUMENTS

| KR | 101691305 B1 | 12/2016 | |
| WO | WO-2016004075 A1 * | 1/2016 | ........... G06F 9/5066 |

OTHER PUBLICATIONS

Meng et al., "Convergence analysis of distributed stochastic gradient descent with shuffling", Jan. 2019, Elsevier, pp. 46-57. (Year: 2019).*

(Continued)

*Primary Examiner* — Qing Yuan Wu

(74) *Attorney, Agent, or Firm* — Scully, Scott, Murphy & Presser, P.C.; Daniel P. Morris

(57) ABSTRACT

Parallel training of a machine learning model on a computerized system is described. Computing tasks of a system can be assigned to multiple workers of the system. Training data can be accessed. The machine learning model is trained, whereby the training data accessed are dynamically partitioned across the workers of the system by shuffling subsets of the training data through the workers. As a result, different subsets of the training data are used by the workers over time as training proceeds. Related computerized systems and computer program products are also provided.

25 Claims, 6 Drawing Sheets

(56) References Cited

OTHER PUBLICATIONS

Chung et al., "UberShuffle: Communication-efficient Data Shuffling for SGD via Coding Theory", 2017, NIPS 2017, pp. 1-7. (Year: 2017).*
Dunner, C., et al., "Primal-Dual Rates and Certificates", arXiv preprint arXiv:1602.05205v2, Jun. 2, 2016, 23 pages.
Dunner, C., et al., "Snap ML: A Hierarchical Framework for Machine Learning", 32nd Conference on Neural Information Processing Systems (NeurIPS 2018), Dec. 2-8, 2018, 11 pages.
Harlap, A., et al., "Proteus: agile ML elasticity through tiered reliability in dynamic resource markets", EuroSys '17, Apr. 23-26, 2017, 16 pages.
Jaggi, M., et al., "Communication—Efficient Distributed Dual Coordinate Ascent", Advances in Neural Information Processing Systems, Sep. 2014, 9 pages.
Lin, T., et al., "Don't Use Large Mini-Batches, Use local SGD", arXiv:1808.07217v4, Feb. 5, 2019, 30 pages.
Qiao, A., et al., "Litz: An Elastic Framework for High-Performance Distributed Machine Learning", Proceedings of the 2018 USENIX Annual Technical Conference (USENIX ATC '18), Jul. 11-13, 2018, pp. 631-643.
Sikdar, S., An Experimental Comparison of Complex Object Implementations for Big Data Systems, In Proceedings of the 2017 Symposium on Cloud Computing, SoCC '17, Sep. 24-27, 2017, pp. 432-444.
Smith, V., "CoCoA: A General Framework for Communication—Efficient Distributed Optimization", Journal of Machine Learning Research, Submitted Oct. 2016, Published Jul. 2018, pp. 1-49, vol. 18.
Stuedi, P., et al., "Crail: A High-Performance I/O Architecture for Distributed Data Processing", Bulletin of the Technical Committee on Data Engineering, Mar. 2017, pp. 38-49, vol. 40, No. 1.
Zaharia, M., et al., "Spark: Cluster Computing with Working Sets", Proceedings of the 2Nd USENIX Conference on Hot Topics in Cloud Computing, HotCloud'10, USENIX Association, Jul. 2010, 7 pages.
Zhang, H., et al., "Slaq: Quality-Driven Scheduling for Distributed Machine Learning", SoCC' 17, Sep. 24-27, 2017, 15 pages.
Zhang, J., et al., "An Adaptive Synchronous Parallel Strategy for Distributed Machine Learning", IEEE Access, Special Section on Novel Learning Applications and Services for Smart Campus, pp. 19222-19230, vol. 6.
Wajahat, M., et al., "Using Machine Learning for Black-Box Autoscaling", 2016 Seventh International Green and Sustainable Computing Conference (IGSC), Jan. 2016, 8 pages.
Hsieh, C.-J., et al., "PASScoDe: Parallel Asynchronous Stochastic Dual Co-ordinate Descent", Proceedings of the 32nd International Conference on Machine Learning, Apr. 2015, 10 pages, JMLR: W&CP vol. 37.
Liu, J., et al., "An Asynchronous Parallel Stochastic Coordinate Descent Algorithm", Journal of Machine Learning Research, Submitted Jun. 2014, Published Feb. 2015, pp. 285-322, vol. 16.
Parnell, T., et al., "Tera-scale coordinate descent on GPUs", Future Generation Computer Systems, Received Aug. 11, 2017, Received in revised form Jan. 24, 2018, Accepted Apr. 23, 2018, 19 pages.
Niu, F., et al., "HOGWILD!: A Lock-Free Approach to Parallelizing Stochastic Gradient Descent", Advances in Neural Information Processing Systems, Jun. 2011, 9 pages.
Shalev-Shwartz, S., et al., "Stochastic Dual Coordinate Ascent Methods for Regularized Loss", Journal of Machine Learning Research, Submitted Sep. 2012, Revised Jan. 2013, Published Feb. 2013, pp. 567-599, vol. 14.
List of IBM Patents or Patent Applications Treated as Related, dated May 7, 2019, 2 pages.
Ahn, S., et al, "Soft memory box: A virtual shared memory framework for fast deep neural network training in distributed high performance computing", IEEE Access, Received Mar. 10, 2018, accepted Apr. 23, 2018, date of publication May 8, 2018, date of current version Jun. 5, 2018, pp. 26493-26504, vol. 6.
Kwon, Y., et al., "Beyond the Memory Wall: A Case for Memory-centric HPC System for Deep Learning", 2018 51st Annual IEEE/ACM International Symposium on Microarchitecture, 2018, pp. 148-161, vol. 51.
Phanishayee, A., et al., "PipeDream: Fast and Efficient Pipeline Parallel DN N Training", arXiv, v1806.03377v1, Jun. 8, 2018, pp. 1-14.
Office Action dated Jul. 28, 2022 received in U.S. Appl. No. 16/405,329, 51 pages.
Dai, W., et al., "Toward Understanding the Impact of Staleness in Distributed Machine Learning", arXiv:1810.03264v1 [cs.LG], Oct. 8, 2018, 19 pages.
Peng, Y., et al., "Optimus: An Efficient Dynamic Resource Scheduler for Deep Learning Clusters", EuroSys '18, Apr. 23-26, 2018, 14 pages.
Office Action dated Nov. 9, 2022 received in U.S. Appl. No. 16/405,329, 43 pages.

\* cited by examiner

PARALLEL TRAINING OF MACHINE LEARNING MODELS

BACKGROUND

The present disclosure relates in general to the field of computer-implemented methods and systems enabling parallel training of machine learning models such as generalized linear models. In particular, the present disclosure is directed to methods aiming at improving the convergence of the parallel training algorithm.

Today's individual computerized machines often offer dozens of cores and hundreds of gigabytes of random access memory (RAM) that can, if used efficiently, significantly contribute to improve training performance of machine learning models. In this respect parallel versions of popular machine learning algorithms such a stochastic gradient descent and stochastic coordinate descent have been developed. These methods introduce asynchronicity into the sequential algorithms in order to enable parallelization and better utilization of compute resources.

SUMMARY

According to an aspect, the present invention is embodied as a method of parallel training of a machine learning model (e.g., a generalized linear model) on a computerized system. The system is assumed to have an architecture such that computing tasks of the system can be assigned to multiple workers of the system. The method comprises accessing training data. The machine learning model is then trained, whereby the training data accessed are dynamically partitioned across the workers of the system by shuffling subsets of said training data through the workers. As a result, different subsets of the training data are used by the workers over time as training proceeds.

The dynamic partition of the training data can for instance be achieved by randomly shuffling the subsets of training data through the workers. That is, random permutations of subsets of the training data are used by workers in the course of the training. In variants, the training data subsets are offset across the workers. In all cases, said subsets can be reshuffled upon completion of a training epoch, a sequence of training epochs, or, even, within an epoch (e.g., before completion of an epoch). Note, the shuffling/reshuffling of training data subsets can be restricted to workers running on nodes that share memory, it being noted that this does not preclude a partly distributed setting of the system.

According to another aspect, the invention is embodied as a computerized system. As evoked above, this system has an architecture adapted for assigning computing tasks to multiple workers of the system. E.g., the system may for example have a many-node or many-core architecture, wherein memory (e.g., high bandwidth memory) is preferably shared between processing nodes or cores of the system. In all cases, the system stores a computerized method of parallel training of a machine learning model, whereby the system is configured to access training data and train said machine learning model. In operation, the training data accessed are dynamically partitioned across the workers of the system by shuffling subsets of said training data through the workers, consistently with the above aspect of the invention.

And according to yet another aspect, the invention is embodied as a computer program product for parallel training of a machine learning model on a computerized system such as discussed above. The computer program product comprises a computer readable storage medium having program instructions embodied therewith, wherein the program instructions are executable by the system to cause the latter to take steps according to the present methods.

Computerized systems, methods, and computer program products embodying the present invention will now be described, by way of non-limiting examples, and in reference to the accompanying drawings.

BRIEF DESCRIPTION OF THE DRAWINGS

The accompanying figures, where like reference numerals refer to identical or functionally similar elements throughout the separate views, and which together with the detailed description below are incorporated in and form part of the present specification, serve to further illustrate various embodiments and to explain various principles and advantages all in accordance with the present disclosure, in which.

Figure 1:
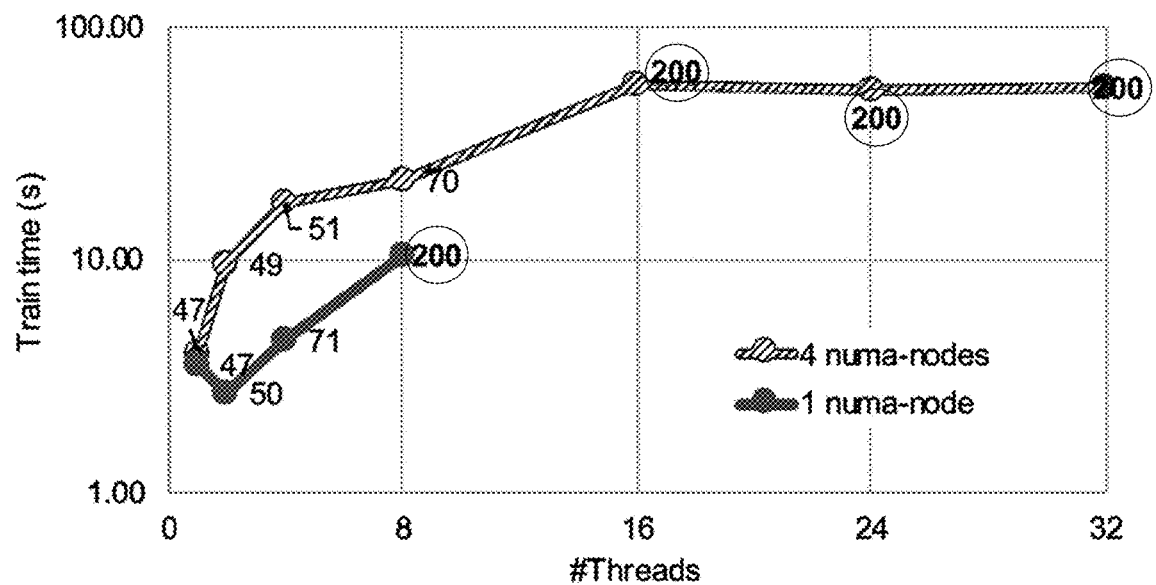
FIG. 1 illustrates the training time required for a multi-threaded solver (here based on a stochastic dual coordinate ascent, or SDCA). The figure shows results obtained in terms of training time, using various numbers of workers (threads). Numeral labels (in black) indicate the number of epochs to converge, whereas values in circles indicate failure to converge.
Figure 2:
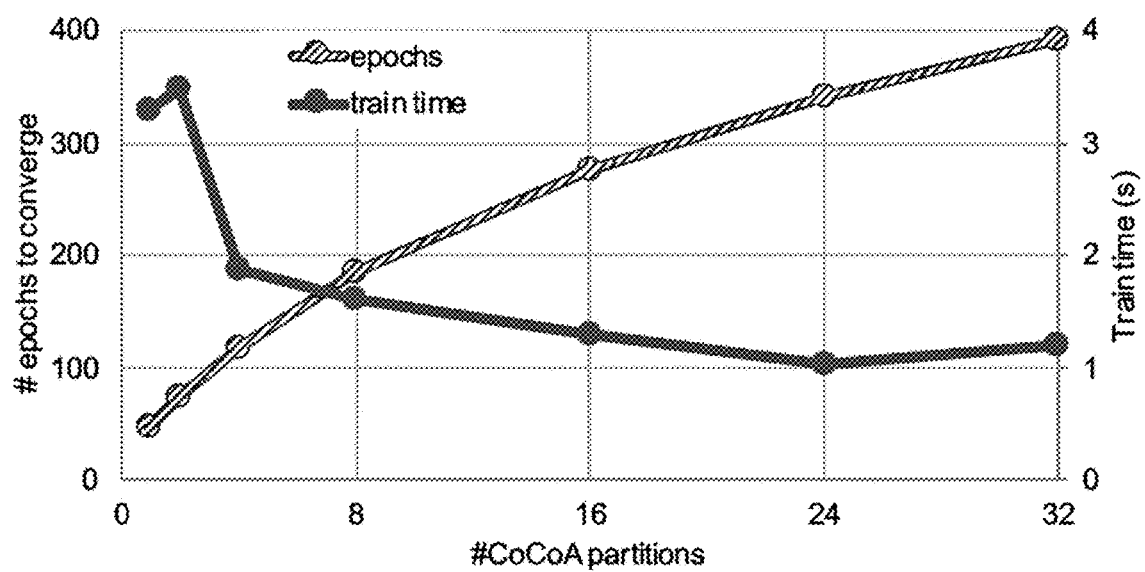
FIG. 2 illustrates the effect of increasing the number of CoCoA partitions in number of epochs and time to converge for the same dataset as used to obtain FIG. 1.

Note, while optimizations made to the training algorithms used to obtain the results of FIGS. 1 and 2 may advantageously be considered in embodiments, such optimizations are not, taken alone and as such, according to embodiments of the present invention.

The accompanying drawings show simplified representations of computerized systems or parts thereof, as involved in embodiments. Similar or functionally similar elements in the figures have been allocated the same numeral references, unless otherwise indicated.

DETAILED DESCRIPTION OF EMBODIMENTS OF THE INVENTION

The present inventors have developed a novel framework that makes it possible to improve the convergence rate of methods of parallel training of machine learning models.

This novel framework is described in detail below; the following description is structured as follows. First, general embodiments and high-level variants are described (sect. 1).

The next section (sect. 2) addresses a particularly preferred embodiment. Section 3 is directed to technical implementation details.

1. General Embodiments and High-Level Variants

In reference to FIGS. 4-7, an aspect of the invention is first described, which concerns a computer-implemented method of parallel training of a machine learning (ML) model. This method is performed on a computerized system 100 (e.g., shown in FIG. 7) that is assumed to have an architecture allowing computing tasks of the system to be assigned to multiple workers 106 of the system. E.g., the system 100 may have a many-core architecture, which may for example have a low-latency, and high-bandwidth memory shared by the cores. A high bandwidth memory (HBM) typically involves a high-performance RAM interface for 3-dimensional (3D)-stacked dynamic random access memory (DRAM), as in embodiments discussed later in detail, notably in reference to FIG. 7, which concerns another aspect of the invention.

The present method and its variants are collectively referred to as "the present methods" in this document. Such methods may include accessing training data 112 (see step S10 in the flowchart of FIG. 4). Next, a parallel training of the ML model is started (steps S20-S30 in FIG. 4), based on the training data as accessed at step S10.

In some embodiments, the training data 112 are dynamically partitioned across workers 106 of the system 100. In some embodiments, this is achieved by shuffling S50 subsets TD1-TD8 of the training data 112 through workers 106 of the system 100. As a result, different subsets TD1-TD8 of the training data 112 are used by the workers 106 in the course of the training (e.g., over time, as training S30 proceeds). For example, each worker may operate with a different subset of the training data (e.g., which may be randomly selected) at every training epoch (an epoch corresponds to one pass through all training data samples).

As present inventors observed, the above scheme exhibit helpful properties, which can improve the convergence rate of the parallel training, in terms of the required number of epochs. In particular, the dynamic partitioning discussed above may advantageously be used together with various other kinds of optimization.

"Workers" are computerized processes or tasks performed on processing nodes (computing entities) of the system that are used for training purposes. Thus, a worker generally refers to a process or task that executes part of the training algorithm S30. In practice, there can be typically a single worker per node and/or machine. However, a worker can be multi-threaded. The training may thus be distributed across worker threads, as in embodiments. A worker thread (or, simply, a "thread") can be regarded as a smallest sequence of programmed instructions that can be managed independently by a scheduler, here for training purposes.

Workers are also sometimes referred to as tasks or subtasks, be it in the literature or in the present document. In the present context in some embodiments, workers operate on distinct subsets of the training data, be it per epoch or sub-epoch (a sub-epoch is a fraction of an epoch), as the present steps of shuffling or reshuffling may indeed be applied within a single training epoch, i.e., applied to sub-epochs.

Note, the present methods may also be applied to other cognitive models than generalized linear models, for example to deep neural networks trained with a stochastic gradient descent algorithm or a similar algorithm.

All this is now described in detail, and in reference to particular embodiments of the invention, which assume that the target ML model is a generalized linear model (GLM), for the sake of illustration.

When aimed at a GLM, the training S30 can be performed based on a stochastic dual coordinate ascent (SDCA), e.g., the workers may implement a SDCA optimizer. In variants, the method may rely on a stochastic gradient descent (SGD) when aimed at a neural network, for example, or other optimization methods. The actual choice of optimization algorithm notably depends on the type of ML model targeted.

Figure 5A:
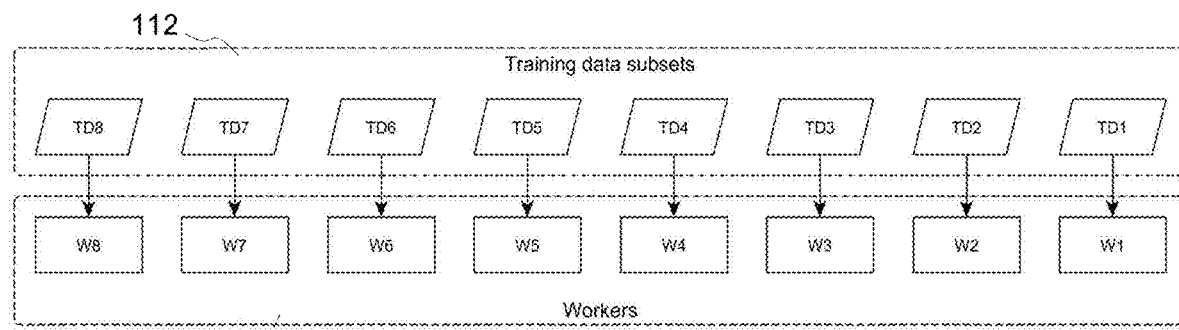
FIGS. 5A-5C and 6A-6C are diagrams that schematically illustrate how training data subsets are allocated to workers and then reshuffled in the course of the training, according to random permutations (FIGS. 5A-5C) or by offsetting the subsets (FIGS. 6A-6C), as in distinct classes of embodiments.
Figure 5B:
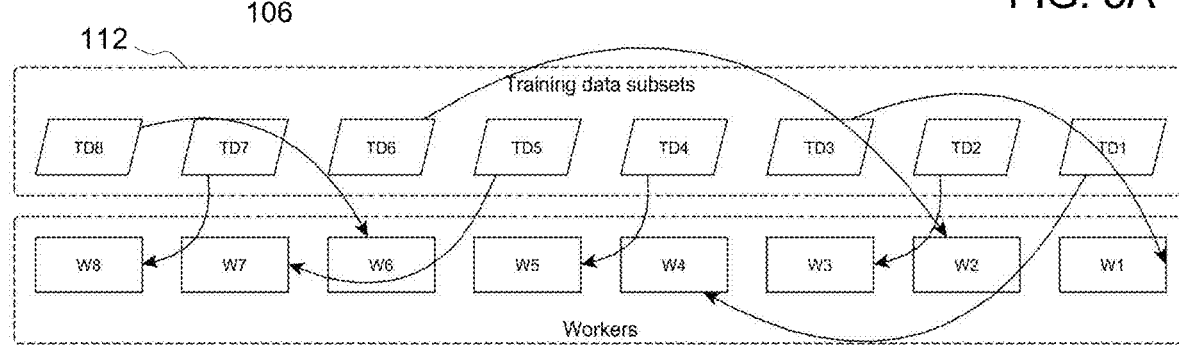
Figure 5C:
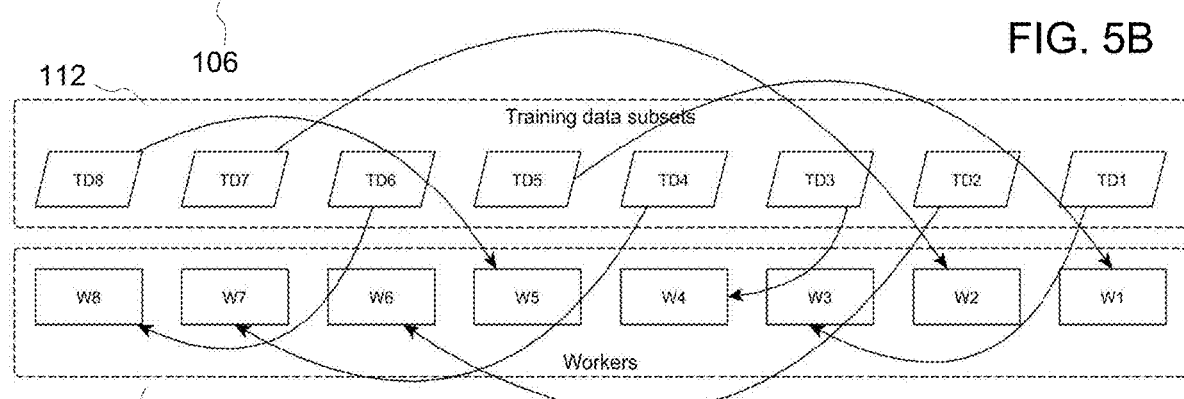

In embodiments, the training data 112 are dynamically partitioned across the workers 106 of the system 100 by randomly shuffling S50 the subsets TD1-TD8 of training data 112 through the workers 106. That is, random permutations of subsets TD1-TD8 of the training data 112 are used by the workers 106 in the course of the training S30 of the model, as illustrated in FIGS. 5A-5C. A random shuffling S50 proves to be advantageous, especially where memory is shared between processing nodes (e.g., cores) on which workers are running, as discussed later in detail.

Figure 6A:
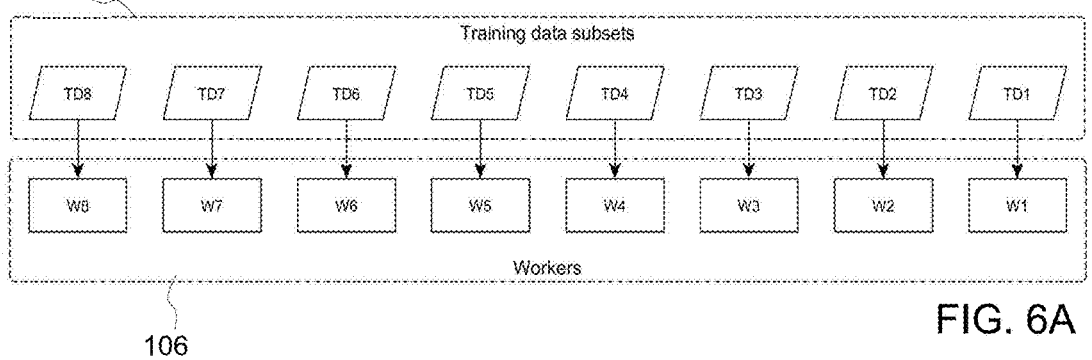
Figure 6B:
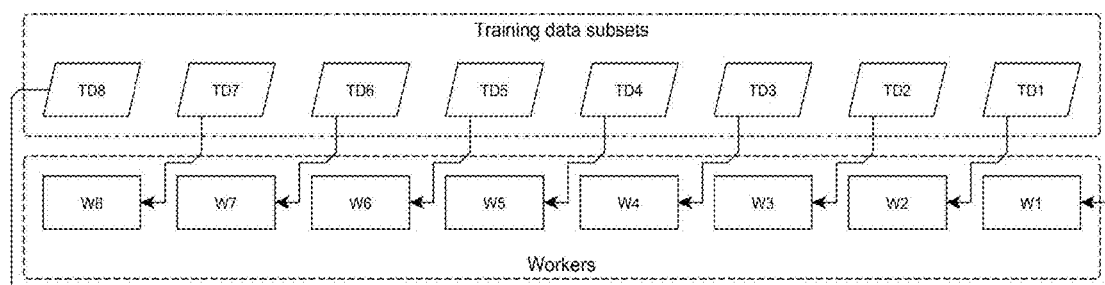
Figure 6C:
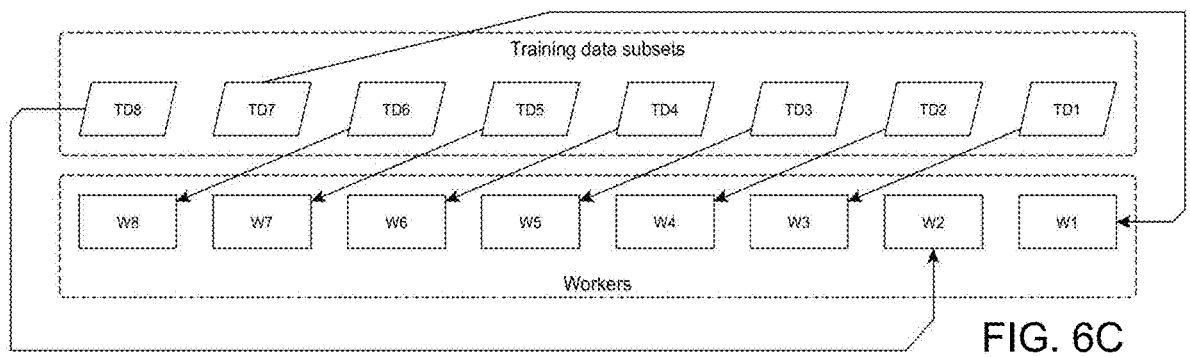

In variants as illustrated in FIGS. 6A-6C, subsets TD1-TD8 of training data 112 are shuffled S50 by offsetting said subsets across the workers 106, e.g., upon completion S40 of a training epoch.

In both cases (random permutations or offsetting of the training data subsets), the process can repeat, until convergence is achieved S60-S70. In some embodiments, the present methods can involve multiple shuffling steps S50, e.g., multiple loops S30-S50, as assumed in the flowchart of FIG. 4. The subsets TD1-TD8 of training data 112 can accordingly be reshuffled S50 upon completion S40 of a training epoch or a sub-epoch, prior to starting S30 a next training epoch (or continuing through a same epoch), and so on.

For example, the training subsets may be reshuffled at every training epoch. That is, said subsets may be reshuffled S50 upon completion S40 of every training epoch, prior to starting S30 a new training epoch. In variants, said subsets may be reshuffled S50 upon completion S40 of a sequence of k training epochs, where k≥2, possibly for every such sequences (e.g., upon completion of every successive sequence of k training epochs). Other variants can be contemplated. For instance, and as evoked earlier, the training S30 of the GLM may lead to reshuffle S50 training data 112 within a same training epoch. That is, the reshuffling S50 may occur across sub-epochs, possibly shuffling m times within each epoch (m>1), meaning that (re)shuffling may occur, for example, in the middle of an epoch or at its beginning and, this, possibly several times within a same epoch.

In some embodiments, the process can start with a static partitioning S20 of the subsets TD1-TD8 of the training data (see FIGS. 5A or 6A), in view of a first (sub)epoch S30 of training. Next, upon completion S40 of this first (sub)epoch, subsets of training data are randomly permuted (FIG. 5B) or simply offset (FIG. 6B) across the workers 106 (individually denoted by W1 . . . W8 in FIGS. 5A-7) in view of a subsequent training (sub)epoch S30. This leads to a further random permutation (FIG. 5C) or offset (FIG. 6C) of the subsets of training data, and so on. The process may accordingly go on until convergence is achieved S60-S70. Convergence is typically monitored thanks to feedback received from the workers 106, e.g., upon completion of each training epoch, although, here again, many possible variants can be contemplated.

In embodiments as evoked earlier, at least some of the processing nodes of the system may have a shared memory. In that case, the training data can be dynamically partitioned by shuffling S50 subsets TD1-TD8 of training data through workers 106 running on such processing nodes, i.e., nodes that share a same memory. For example, in a multi-processing system 100, several cores of the system may access a shared memory, which is typically a block of random access memory (RAM), e.g., a 3D-stacked DRAM.

In some embodiments, the use of a shared memory (as in embodiments evoked above) does not necessarily preclude a (partly) distributed architecture. That is, in embodiments, the system may have an architecture in which processing nodes are arranged in sets of nodes of shared memory. For example, in each set, nodes can share memory, whereas nodes of distinct sets do not. In that case, training data can be partitioned by shuffling S50 subsets of training data only through workers running on nodes of a same set (and e.g., within each of said sets of nodes).

A suitable architecture may depend on numerous factors, starting with the size of the training set and the data transfers implied by the algorithm. Thus, several possible architectures may be contemplated, this depending on the intended application. The shuffling can be restricted to workers running on nodes that share memory, e.g., within non-uniform memory access (NUMA) nodes only, where the training mechanism otherwise implies large data transfers. For example, a hierarchical scheme may be adopted, whereby the training examples are first statically partitioned across the nodes in a distributed fashion, while a dynamic partitioning is performed within the sole NUMA nodes.

Figure 7:
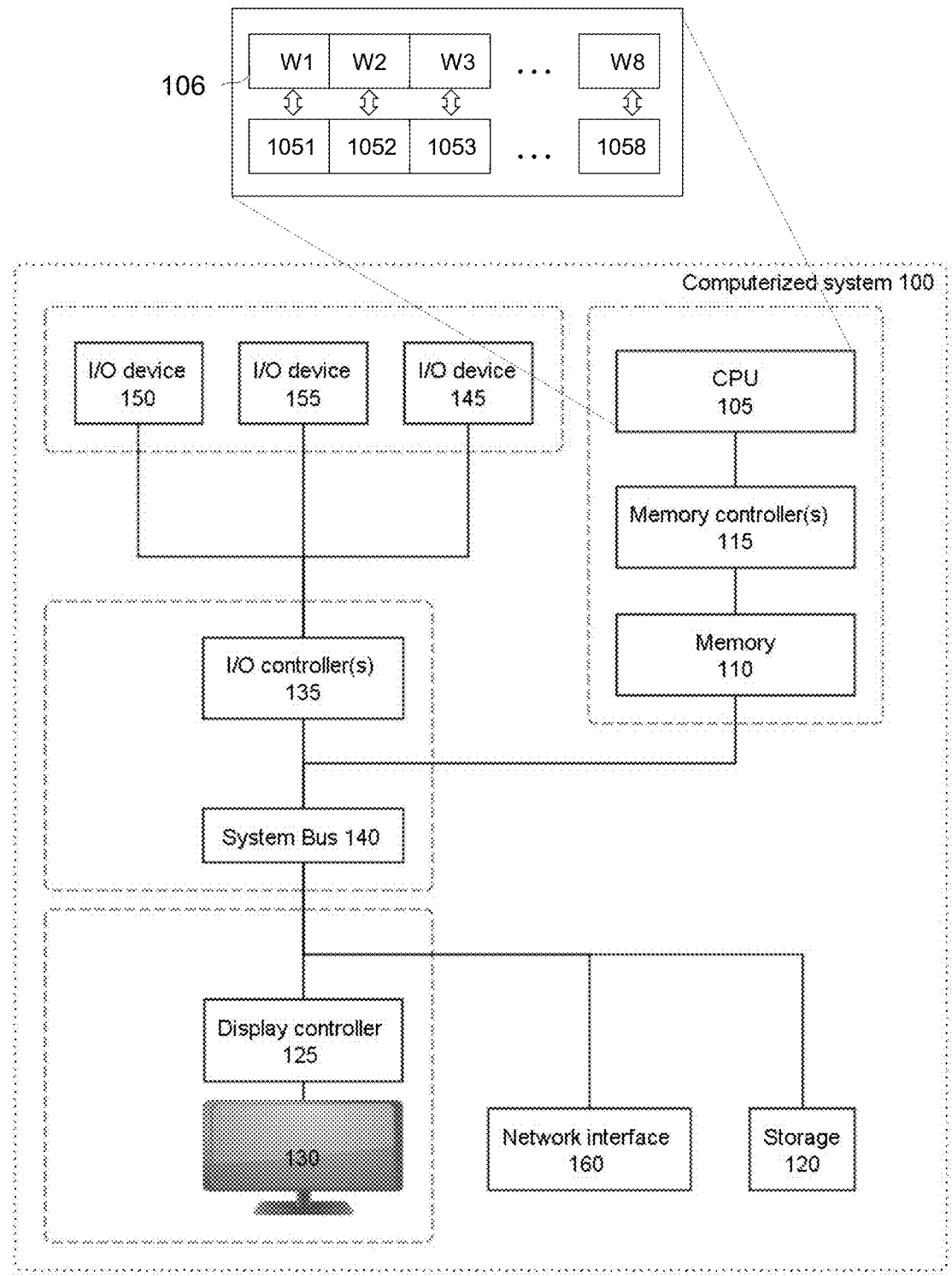
FIG. 7 schematically represents a general-purpose computerized system, suited for implementing method steps as involved in embodiments of the invention.

Referring to FIGS. 5A-7, another aspect of the invention is now discussed, which concerns a computerized system 100. Features and functionality of this system have already been discussed in reference to the present methods; they are only briefly described in the following. In some embodiments, such a system 100 has an architecture adapted for assigning computing tasks to multiple workers 106 of the system. The system 100 may for instance have a central processing unit (CPU) and/or a graphics processing unit (GPU) architecture. This system may for instance include processing 105 and memory means 110, as described in detail in sect. 3.1. In embodiments, the system 100 is assumed to be configured so as to be able to dynamically partition the training data across the workers. For example, FIG. 7 schematically depicts a possible architecture of a general-purpose computing system, designed to assign computing tasks to multiple workers 106 running on processing nodes 1051 ... 1058 of the system.

The system 100 is otherwise assumed to store a computerized method (or a set of computerized methods, e.g., embodied as program instructions), to enable a parallel training of a ML model (e.g., a generalized linear model), as discussed earlier in reference to the present methods. In operation, the system 100 may access training data 112 and train said ML model. The training data 112 accessed are dynamically partitioned across the workers 106 of the system 100 by shuffling subsets TD1-TD8 of the training data through the workers 106. Thus, different subsets of the training data are used by the workers over time as training proceeds, in operation.

As schematically illustrated in FIG. 7, the system 100 may notably have a many-core architecture, wherein part or all of the processing cores 1051 ... 1058 share memory, e.g., a high bandwidth memory, as evoked earlier. Shared memory across cores usually involves multiple levels, including, for example, fast shared cache, a block of random access memory, etc.

In embodiments, the system 100 is further configured to dynamically partition the training data 112 by randomly shuffling the subsets TD1-TD8 of training data through the workers 106. In variants, it may simply offset such subsets across the workers, as explained earlier in reference to the present methods. And more generally, the system 100 may be configured to implement any step as discussed earlier in reference to the present methods, and particular embodiments or variants thereof.

According to yet another aspect, the invention can be embodied as a computer program product for parallel training of a ML model on a computerized system such as described above. The computer program product comprises a computer readable storage medium having program instructions embodied therewith, where such program instructions are executable by processing means of the system 100 to cause the latter to implement steps as discussed earlier in reference to the present methods. Additional aspects of such computer program products are further discussed in sect. 3.2.

The above embodiments have been succinctly described in reference to the accompanying drawings and may accommodate a number of variants. Several combinations of the above features may be contemplated. Examples are given in the next section.

2. Specific Embodiments

Prior research efforts have addressed the challenge of parallelizing SCD in a distributed, data-parallel setting. Here the training data is assumed to be partitioned across the worker nodes in a cluster, whereas moving data over the network is typically costly. To this end, state-of-the art first-order and second-order methods, attempt to pair good convergence guarantees with efficient distributed communication. To approach this, a prior research defines data-local subproblems that can be operated on in parallel by the different workers and define a shared vector that is periodically exchanged over the network to synchronize their work. Such a method can scale to an arbitrary number of nodes.

While distributed algorithms can theoretically achieve a larger degree of parallelism compared to their parallel asynchronous counterparts, the convergence rate of many popular methods, show an unfavorable dependence on the number of workers K: the number of required iterations scales with O(K). Since the execution time per iteration speeds up at most by a factor of K when scaling to K workers, we cannot expect faster total execution time by scaling out using these methods. Hence, traditional distributed algorithms are not well suited to achieving significant acceleration; they are primarily designed to enable training of large datasets that do not fit into a single machine.

To illustrate this behavior, we use a prior method in a multi-threaded setting to train a logistic regression model on a synthetic dense dataset. Results depicted in FIG. 2 show that as we increase the number of worker threads the number of epochs to converge increases significantly, achieving a mere 2.7× speedup with 32 cores.

We propose to increase data parallelism of the algorithm to improve scalability. To achieve this, we may rely on individual workers that independently work on a local copy of the shared vector which is synchronized periodically. This approach is mapped to a parallel architecture where we partition the coordinates across the threads and replicate the shared vector in each one of the threads. In this way, the global shared vector need be accessed by the different threads much less frequently. Additional benefits of this approach are that it improves scalability and is less prone to divergence.

The static partitioning of the training examples across workers may increase the epochs needed for convergence. In order to alleviate this issue, we leverage that threads within a single machine have access to fast shared memory space and propose a dynamic partitioning for our multi-threaded implementation.

We shuffle all the examples at the beginning of each epoch, and each thread picks a different set of examples in each epoch. Such a repartitioning approach is very effective for convergence.

Figure 3:
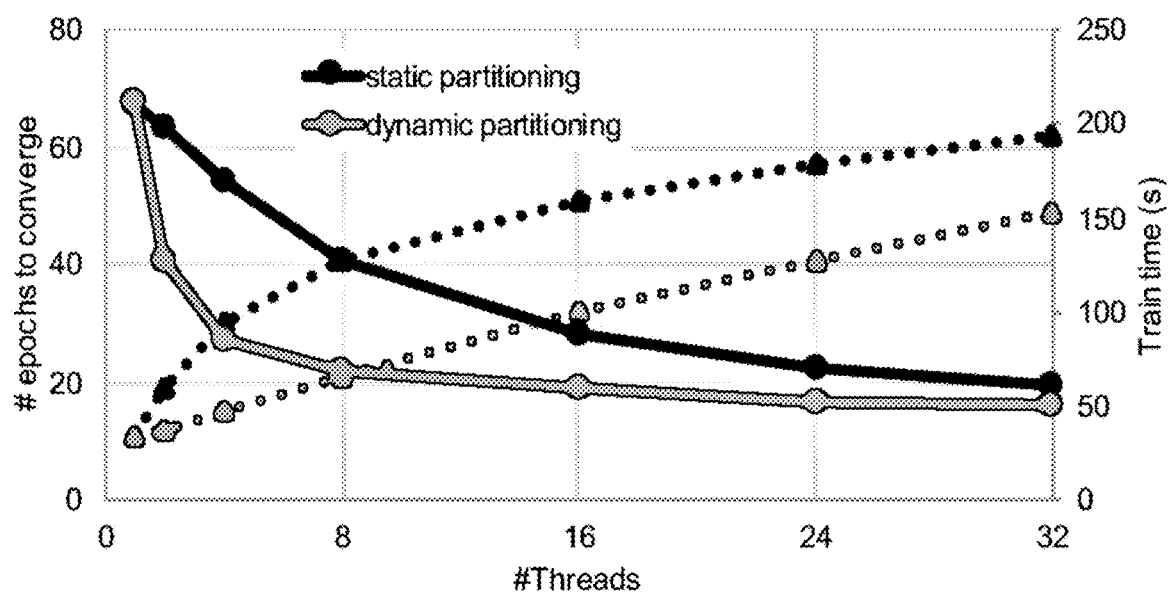
FIG. 3 compares gains achieved with a dynamic data partitioning scheme (as involved in embodiments) against a default static partitioning, in terms of numbers of epochs to converge with increasing thread counts, and under various levels of optimization.
Figure 4:
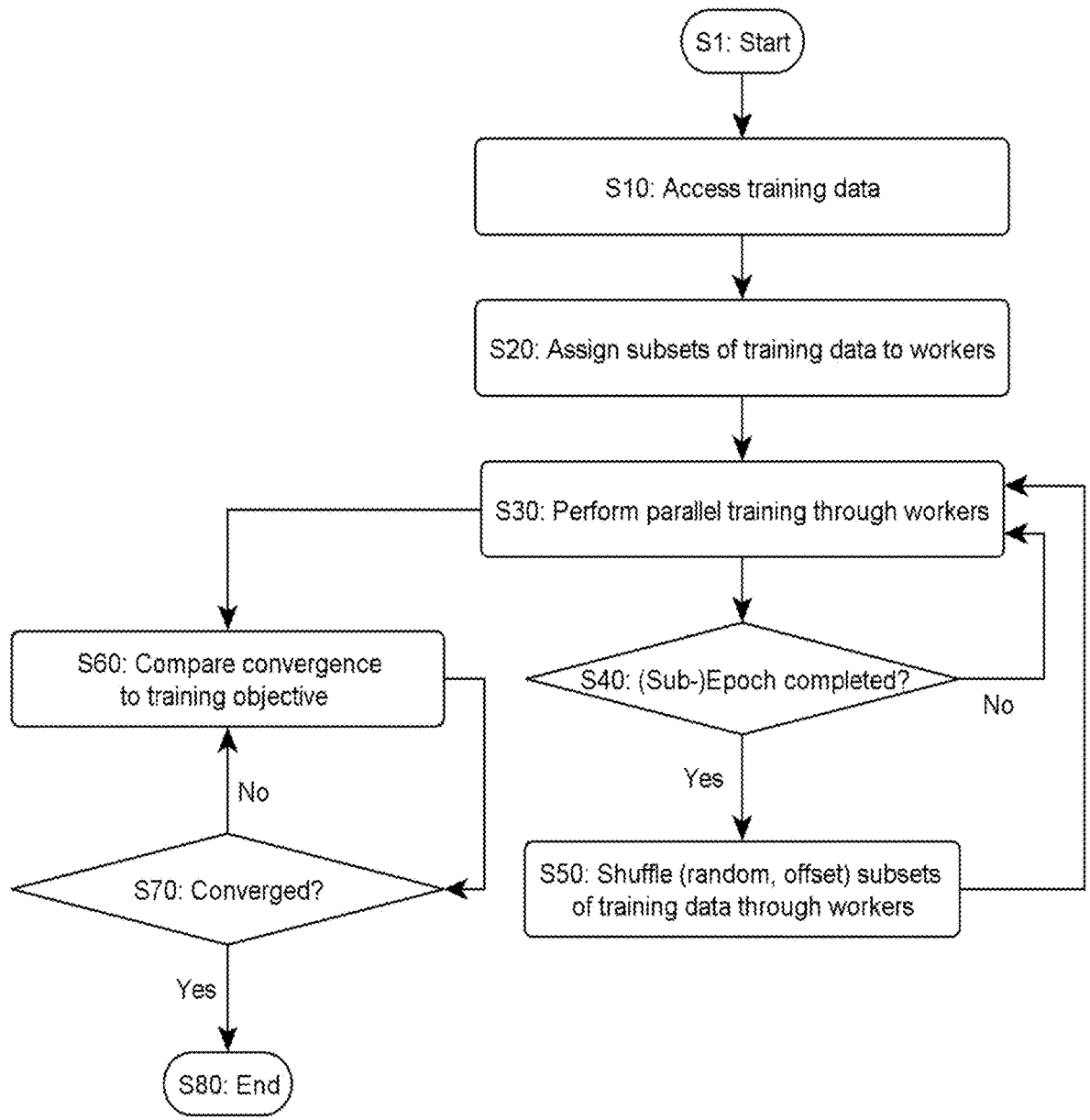
FIG. 4 is a flowchart illustrating high-level steps of a method of parallel training of a machine learning model, as in preferred embodiments.

We can evaluate the effect of the dynamic data partitioning scheme against a default static partitioning. FIG. 3 compares the two schemes. By dynamically shuffling the training examples across worker threads within each node after every epoch we are able to gain an improvement in total training of 49% on average compared to the static partitioning, realizing most of the achieved 54% average reduction in epochs.

3. Technical Implementation Details 3.1 Computerized Systems

Computerized systems (including one or more computerized devices) can be suitably designed for implementing embodiments of the present invention. For instance, a suitable computerized system 100 may include processing elements (noted CPU such as multi-core processors 105 (FIG. 7, collectively referred to as the "processor") and a memory 110 coupled to a memory controller 115. The processor 105 is a hardware device for executing software, as, e.g., loaded in a main memory of the device. The processor can be any custom made or commercially available processor.

The memory 110 typically includes a combination of volatile memory elements (e.g., random access memory) and nonvolatile memory elements, e.g., solid-state devices. The software in memory may include one or more separate programs, each of which may for instance comprise an ordered listing of executable instructions for implementing logical functions. In the example of FIG. 7, the software in the memory 110 includes a computerized method as described herein in accordance with exemplary embodiments and a suitable operating system (OS). The OS essentially controls the execution of other computer (application) programs and provides scheduling, I/O control, file, data and memory management, and communication control as well as related services. In the present case, the scheduling of tasks is adapted so as to allow training data subsets to be dynamically assigned to workers of the system, in order to enable a dynamic partitioning as taught in embodiments.

In exemplary embodiments, and in terms of hardware architecture, the system 100 may further include one or more input and/or output (I/O) devices 145, 150, 155 (or peripherals) communicatively coupled via a local input/output controller 135. The input/output controller 135 can comprise or connect to one or more buses 140 or other wired or wireless connections. The input/output controller 135 may have additional elements, which are omitted for simplicity, such as controllers, buffers (caches), drivers, and receivers, etc., to enable communications. Further, a local interface may include address, control, and/or data connections to enable appropriate communications among the aforementioned components.

Possibly, a conventional keyboard 150 and mouse 155 can be coupled to the input/output controller 135. Other I/O devices 145-155 may include other hardware devices, i.e., I/O devices that communicate both inputs and outputs. The system 100 may further include a display controller 125 coupled to a display 130. In exemplary embodiments, the system 100 may further include a network interface 160 or transceiver for coupling to a network (not shown).

The methods described herein shall typically be in the form of executable program, script, or, more generally, any form of executable instructions.

In operation, one or more of the processing elements 105 execute software stored within the memory 110, to communicate data to and from the memory 110, and to generally control operations pursuant to software instructions. Separate memory elements may possibly be dedicated to subsets of processing elements of the processor 105, it being reminded that the system 100 preferably has a many-core computing architecture, e.g., with a low-latency, and high-bandwidth memory shared between the cores. As noted earlier too, a high bandwidth memory (HBM) is preferably relied upon, together with a high-performance RAM interface for, e.g., a 3D-stacked DRAM. The methods described herein, in whole or in part are read by the processor 105, typically buffered therein, and then executed. When the methods described herein are implemented in software, the methods can be stored on any computer readable medium for use by or in connection with any computer related system or method.

Computer readable program instructions described herein can be downloaded to processing elements 105 from a computer readable storage medium, via a network, for example, the Internet and/or a wireless network. A network adapter card or network interface 160 in the device may receive the computer readable program instructions from the network and forwards the program instructions for storage in a computer readable storage medium 120 interfaced with the processing elements.

3.2 Computer Program Product

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated.

What is claimed is:

1. A method of parallel training of a machine learning model on a computerized system having an architecture such that computing tasks of the system can be assigned to multiple workers of the system, wherein the method comprises:

accessing training data; and training said machine learning model, whereby the training data accessed are dynamically partitioned across the workers of the system by shuffling subsets of said training data through the workers, such that different subsets of the training data are used by the workers over time as training proceeds,
wherein training said machine learning model comprises reshuffling said subsets of the training data by offsetting said subsets of the training data across the workers.

2. The method according to claim 1, wherein
said machine learning model is a generalized linear model.

3. The method according to claim 1, wherein
said training is performed based on a stochastic dual coordinate ascent.

4. The method according to claim 1, wherein
said system has a distributed architecture, whereby processing nodes of the computerized system are arranged in sets of nodes, wherein only those nodes of a same one of the sets have a shared memory, and
at training, the training data accessed are dynamically partitioned across the workers of the system by shuffling subsets of said training data only through workers running on nodes of a same one of the sets.

5. The method according to claim 1, wherein
training said machine learning model comprises reshuffling said subsets of the training data upon completion of a training epoch, prior to starting a next training epoch.

6. The method according to claim 5, wherein
training said machine learning model comprises reshuffling said subsets of the training data upon completion of every training epoch, prior to starting a new training epoch.

7. The method according to claim 5, wherein
training said machine learning model comprises reshuffling said subsets of the training data upon completion of every successive sequence of k training epochs, where k≥2.

8. The method according to claim 1, wherein
training said machine learning model comprises reshuffling said subsets of the training data by offsetting said subsets of the training data across the workers upon completion of a training epoch.

9. The method according to claim 8, wherein
training said machine learning model comprises reshuffling said subsets of the training data by offsetting said subsets of the training data across the workers upon completion of every successive sequence of k training epochs, where k≥2.

10. The method according to claim 8, wherein
training said machine learning model first comprises creating a static partitioning of said subsets of the training across the workers, for a first training epoch, and wherein, upon completion of the first training epoch, said subsets are then offset across the workers for a subsequent training epoch.

11. The method according to claim 10, wherein
said subsets are subsequently offset across the workers upon completion of every training epoch.

12. The method according to claim 1, wherein
training said machine learning model comprises reshuffling said subsets of the training data within a same training epoch.

13. A computerized system having an architecture adapted for assigning computing tasks to multiple workers of the system, wherein the computerized system stores a computerized method of parallel training of a machine learning model, the system comprising at least one hardware processor and the hardware processor is configured to:
access training data; and
train said machine learning model, so as for the training data accessed to be dynamically partitioned across the workers of the system by shuffling subsets of said training data through the workers, such that different subsets of the training data are used by the workers over time as training proceeds, in operation,
wherein training said machine learning model comprises reshuffling said subsets of the training data by offsetting said subsets of the training data across the workers.

14. The computerized system according to claim 13, wherein
said system has a many-core architecture.

15. The computerized system according to claim 14, wherein
the computerized system has a memory shared between processing cores of the system.

16. The computerized system according to claim 15, wherein
said memory is a high bandwidth memory.

17. The computerized system according to claim 13, wherein
the system is configured to dynamically partition the training data across worker threads of said workers.

18. The computerized system according to claim 13, wherein
the system is configured to dynamically partition the training data by reshuffling the subsets of the training data through the workers upon completion of a training epoch, prior to starting a next training epoch, in operation.

19. The computerized system according to claim 18, wherein
the system is configured to dynamically partition the training data by reshuffling the subsets of the training data through the workers upon completion of every successive sequence of k training epochs, where k≥2, prior to starting a next training epoch.

20. The computerized system according to claim 13, wherein
the system is configured to reshuffle the subsets of the training data by offsetting said subsets of the training data across the workers upon completion of a training epoch.

21. The computerized system according to claim 20, wherein
the system is configured to dynamically partition the training data by first creating a static partitioning of said subsets of the training across the workers, for a first training epoch, and, upon completion of the first training epoch, offsetting said subsets across the workers for a subsequent training epoch.

22. A computer program product for parallel training of a machine learning model on a computerized system having architecture such that computing tasks of the system can be assigned to multiple workers of the system, the computer program product comprising a computer readable storage medium having program instructions embodied therewith, the program instructions executable by the computerized system to cause the computerized system to:
access training data; and
train said machine learning model, whereby the training data accessed are dynamically partitioned across the workers of the system by shuffling subsets of said training data through the workers, such that different subsets of the training data are used by the workers over time as training proceeds, wherein training said machine learning model comprises reshuffling said subsets of the training data by offsetting said subsets of the training data across the workers.

23. The computer program product of claim 22, wherein said machine learning model is a generalized linear model.

24. The computer program product of claim 22, wherein said training is performed based on a stochastic dual coordinate ascent.

25. The computer program product of claim 22, wherein training said machine learning model comprises reshuffling said subsets of the training data upon completion of a training epoch, prior to starting a next training epoch.

\* \* \* \* \*